United States Patent Office 3,031,451
Patented Apr. 24, 1962

3,031,451
SALT OF NICOTINIC ACID
Albert Schlesinger, Jackson Heights, N.Y., assignor to Endo Laboratories, Inc., Richmond Hill, N.Y., a corporation of New York
No Drawing. Filed July 21, 1960, Ser. No. 44,271
1 Claim. (Cl. 260—253)

This invention relates to a novel salt of nicotinic acid. In particular it is directed to the novel nicotinic acid salt of 1,3-dimethyl-7-(dimethylamino ethyl)-xanthine and it has particular relation to the neutral salt resulting from the interaction of equivalent amounts of 1,3-dimethyl-7-(dimethylamino ethyl)-xanthine and nicotinic acid.

Nicotinic acid and its esters have been used heretofore as blood vessel dilating agents. These compounds have to be administered in large doses and often over a long period of time, thereby producing also erythema and other unpleasant secondary effects.

The compound of this invention uniquely provides vasodilation without causing hypotension. This is in contrast to the action of the nicotinate of 1,3-dimethyl-7-(diethylaminoethyl)-xanthine which is a hypotensive agent.

The compound of this invention is also markedly effective in counteracting pentobarbital hypnosis; and produces respiratory stimulating effects without the occurrence of locomotor stimulation.

Accordingly, it is among the principal objects of this invention to provide a new compound having improved properties for use as a blood vessel dilating agent and affecting favorably the circulatory system, thereby causing a decrease in the total peripheral resistance.

It is a further object to provide a novel salt of nicotinic acid with more favorable therapeutic index and a wider individual tolerance for oral and parenteral administration in human therapy.

It is a still further object of this invention to provide the neutral nicotinic acid salt of 1,3-dimethyl-7-(dimethylamino ethyl)-xanthine which provides vasodilation without causing hypotension.

The compound of this invention, having such improved properties is the neutral nicotinic acid salt of 1,3-dimethyl-7-(dimethylamino ethyl)-xanthine, the latter having the structural formula

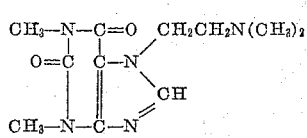

and being distinguished from all other known xanthine derivatives by having a mood equilibrating effect. (R. C. Batterman et al., Am. J. Med. Sci. 236, p. 162 (1958).)

The best mode of preparing the compound of this invention is to react the nicotinic acid with the equivalent amount of 1,3-dimethyl-7-(dimethylamino ethyl)-xanthine in a solvent, whereby the neutral salt is formed and recovering the crystalline product by filtration.

*Example*

50.2 grams (0.1 mol) of 1,3-dimethyl-7-(dimethylamino ethyl)-xanthine and 24.6 grams (0.1 mol) of nicotinic acid are dissolved in 200 cc. of boiling ethanol, filtered hot, and the filtrate cooled in an ice bath. The neutral salt, corresponding to the formula $$C_{11}H_{17}N_5O_2 \cdot C_6H_5NO_2$$

is obtained in crystalline form. It melts at 124°–126° C.

I claim:
The neutral nicotinic acid salt of 1,3-dimethyl-7-dimethylamino ethyl)-xanthine having the structural formula:

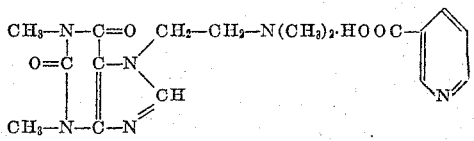

No references cited.

UNITED STATES PATENT OFFICE
CERTIFICATE OF CORRECTION

Patent No. 3,031,451                                      April 24, 1962

Albert Schlesinger

It is hereby certified that error appears in the above numbered patent requiring correction and that the said Letters Patent should read as corrected below.

Column 2, line 41, strike out "No references cited.", and insert the following:

References Cited in the file of this patent

UNITED STATES PATENTS 2,924,598        Bestian ---------------- Feb. 9, 1960

FOREIGN PATENTS 669,070        British --------------- Mar. 26, 1952
190,944        Austrian -------------- July 25, 1957

Signed and sealed this 20th day of August 1963.

SEAL)
Attest:

ERNEST W. SWIDER                              DAVID L. LADD
Attesting Officer                                  Commissioner of Patents